United States Patent
Lu et al.

(10) Patent No.: US 8,935,522 B2
(45) Date of Patent: *Jan. 13, 2015

(54) ELECTRONIC COMPUTING DEVICE AND A REBOOT METHOD EXECUTABLE BY SAME

(71) Applicants: Chi-Chang Lu, New Taipei (TW); Deng-Rung Liu, New Taipei (TW)

(72) Inventors: Chi-Chang Lu, New Taipei (TW); Deng-Rung Liu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/853,221

(22) Filed: Mar. 29, 2013

(65) Prior Publication Data

US 2013/0227265 A1 Aug. 29, 2013

Related U.S. Application Data

(62) Division of application No. 12/768,738, filed on Apr. 28, 2010, now Pat. No. 8,443,182.

(30) Foreign Application Priority Data

Mar. 30, 2010 (CN) .......................... 2010 1 0136237

(51) Int. Cl.
*G06F 9/24* (2006.01)
*G06F 15/177* (2006.01)
*G06F 9/44* (2006.01)
*G06F 9/445* (2006.01)

(52) U.S. Cl.
CPC ............... *G06F 9/442* (2013.01); *G06F 9/445* (2013.01)
USPC .................................................. 713/2; 713/1

(58) Field of Classification Search
CPC .................................. G06F 9/442; G06F 9/445
USPC .......................................................... 713/1, 2
See application file for complete search history.

(56) References Cited

U.S. PATENT DOCUMENTS

| | | | |
|---|---|---|---|
| 6,854,054 B1 | 2/2005 | Kavanagh | |
| 6,965,989 B1 | 11/2005 | Strange et al. | |
| 7,103,718 B2 | 9/2006 | Nickel | |
| 8,443,182 B2 * | 5/2013 | Lu et al. | 713/2 |
| 2002/0051394 A1 * | 5/2002 | Tobita et al. | 365/221 |
| 2004/0044838 A1 * | 3/2004 | Nickel et al. | 711/104 |
| 2004/0260919 A1 * | 12/2004 | Takahashi | 713/2 |
| 2005/0216721 A1 * | 9/2005 | Zimmer et al. | 713/2 |
| 2005/0246701 A1 * | 11/2005 | Kanapathipillai et al. | 717/168 |
| 2006/0142906 A1 * | 6/2006 | Brozovich et al. | 701/29 |

(Continued)

FOREIGN PATENT DOCUMENTS

| | | |
|---|---|---|
| CN | 1952834 A | 4/2007 |
| CN | 101097521 A | 1/2008 |
| TW | 200841710 A | 10/2008 |

*Primary Examiner* — Vincent Tran
(74) *Attorney, Agent, or Firm* — Novak Druce Connolly Bove + Quigg LLP

(57) ABSTRACT

A media data playback device comprises first and second nonvolatile memories. The first nonvolatile memory stores a boot loader and a kernel of an operating system in a compressed format. The second nonvolatile memory serves as a main memory of the device. A processor executes the boot loader to load the kernel from the first nonvolatile memory to the second nonvolatile memory in response to a boot command. When receiving an interrupt representing a shutdown command, the processor determines whether to clear the second nonvolatile memory in response to the shutdown command before actually shutting down the device.

46 Claims, 7 Drawing Sheets

(56) References Cited

U.S. PATENT DOCUMENTS

| | | | |
|---|---|---|---|
| 2006/0288154 A1* | 12/2006 | Huang et al. | 711/106 |
| 2008/0235505 A1* | 9/2008 | Hobson et al. | 713/100 |
| 2008/0239552 A1 | 10/2008 | Kimura | |
| 2009/0319720 A1 | 12/2009 | Stefanus | |
| 2010/0058041 A1* | 3/2010 | John et al. | 713/2 |
| 2010/0058046 A1* | 3/2010 | John et al. | 713/2 |
| 2010/0185804 A1* | 7/2010 | Omizo et al. | 711/103 |
| 2010/0217966 A1* | 8/2010 | Shim | 713/2 |

* cited by examiner

ELECTRONIC COMPUTING DEVICE AND A REBOOT METHOD EXECUTABLE BY SAME

CROSS-REFERENCE TO RELATED APPLICATIONS

This application is a divisional of U.S. application Ser. No. 12/768,738, entitled "MEDIA DATA PLAYBACK DEVICE AND REBOOT METHOD THEREOF", filed on Apr. 28, 2010, published as US20110246758A1 and issued as U.S. Pat. No. 8,443,182, which is based upon and claims the benefit of priority from Chinese Patent Application No. 201010136237.4, filed on Mar. 30, 2010 in the People's Republic of China. The entirety of each of the above-mentioned patent applications is hereby incorporated by reference herein.

BACKGROUND

1. Technical Field

The disclosure relates to computer technologies, and more particularly to a media data playback system and reboot method thereof.

2. Description of Related Art

TV converters, known as set-top boxes, manage the higher channel numbers not supported by TVs, descramble, decrypt, and decode channel signals into rich video content and other information, such as program guides. During the bootstrapping of a set-top box, a boot loader is executed to clear a main memory, decompress and load and the OS from a flash memory to the main memory for execution. Since memory clearing and OS loading is a portion of the bootstrapping, reboot is also an option to solve system failure, for example, when a virtual memory area is erroneously overwritten. Decompressing and loading an OS, however, may be time consuming and delays video display.

DETAILED DESCRIPTION

Description of exemplary embodiments of media data playback device and reboot method thereof is given in the following paragraphs which are organized as:
1. System Overview
   1.1 Exemplary Media Data Playback Device
   1.2 Exemplary Embodiments of Main Memory
2. Exemplary operations of the media data playback device
   2.1 Operations Before Device Shutdown
   2.2 Operations During Device Bootstrapping
3. Conclusion

1. System Overview

The disclosed media data playback device can be implemented as a stand-alone device or integrated in various media data playback devices, such as a set top box, a cell phone, a tablet personal computer (PC), a laptop computer, a monitor, a multimedia player, a digital camera, a personal digital assistant (PDA), a navigation device or a mobile internet device (MID).

1.1 Exemplary Media Data Playback Device

Figure 1:
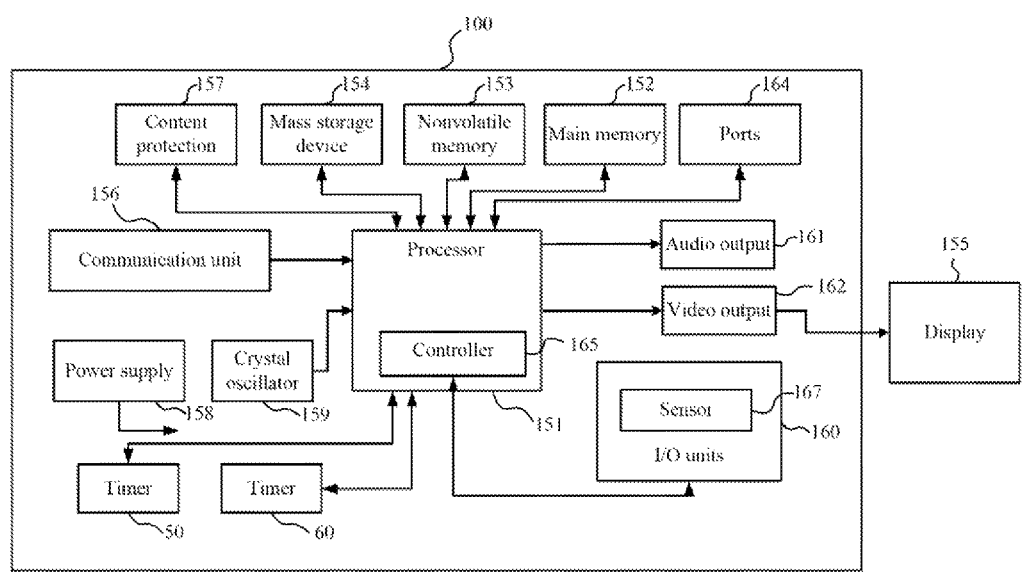
FIG. 1 is a block diagram of an exemplary embodiment of a media data playback device.

With reference to FIG. 1, a processor 151 comprises a central processing unit of the media data playback device 100. The processor 151 may comprise various integrated circuits (ICs) for processing data and machine-readable instructions. Connection of the components in the device 100 is shown in FIG. 1 and may comprise serial or parallel transmission buses, or wireless communication channels. A communication unit 156 establishes communication channels through which the media data playback device 100 may connect to and download media data streams from a remote station. Additionally, the communication unit 156 may establishes wireless communication channels through which a portable device, such as a remote control, may connect to and exchange data with the media data playback device 100. The communication unit 156 may comprise of antennas, baseband and radio frequency (RF) chipsets for wireless local area network (LAN) communication and/or cellular communication such as wideband code division multiple access (W-CDMA) and high speed downlink packet access (HSDPA). Through the established wireless communication channels, the device 100 may serve as a wireless LAN access point through which the portable device connects to the Internet.

The processor 151 may be packaged as a chip or comprise a plurality of chips interconnected through buses. For example, the processor 151 may only comprise of a central processing unit (CPU) or a combination of a CPU, a digital signal processor (DSP), and a chip of a communication controller, such as a chip of the communication unit 156. The communication controller may comprise one or more controllers of wired or wireless communication, such as a cellular communication, infrared, Bluetooth™, or wireless local area network (LAN) communication. The communication controller coordinates communication among components of the media data playback device 100 or communication between the media data playback device 100 and external devices.

A power supply 158 provides electrical power to components of the media data playback device 100. A crystal oscillator 159 provides clock signals to the processor 151 and other components of the media data playback device 100. The timers 50 and 60 keep track of predetermined time intervals and may comprise of circuits, machine-readable programs, or a combination thereof. Each of the timers 50 and 60 generates signals to notify expiration of the predetermined time intervals. Input and output (I/O) units 160 may comprise control buttons, an alphanumeric keypad, a touch panel, a touch screen, and a plurality of light emitting diodes (LEDs). A controller 165 detects operations on the I/O units 160 and transmits signals indicative of the detected operations to the processor 151. The controller 165 also controls operations of the I/O units 160. The processor 151 may control the I/O units 160 through the controller 165. Ports 164 may be used to connect to various computerized interfaces, such as an external computer, or a peripheral device. The ports 164 may comprise physical ports complying with universal serial bus (USB) and IEEE 1394 standards, recommended standard 232 (RS-232) and/or recommended standard 11 (RS-11) defined by Electronics Industries Association (EIA), serial ATA (STATA), and/or high-definition multimedia interface (HDMI).

A content protection system 157 provides access control to digital content reproduced by the device 100. The content protection system 157 may comprise memory and necessary devices for implementing digital video broadcasting-common interface (DVB-CI) and/or conditional access (CA). The device 100 may obtain digital content from broadcast signals through an antenna, a tuner, and a demodulator. Alternatively, the device 100 may obtain digital content from an information network, such as the Internet, through a network interface.

A video output unit 162 comprises filters and amplifiers for filtering and amplifying video signals output by the processor 151. An audio output unit 161 comprises a digital to analog converter converting audio signals output by the processor 151 from digital format to analog format.

A display 155 is operable to display text and images, and may comprise e-paper, a display made up of organic light emitting diode (OLED), a field emission display (FED), or a liquid crystal display (LCD). Alternatively, the display 155 may comprise a reflective display, such as an electrophoretic display, an electrofluidic display, or a display using interferometric modulation. The display 155 may display various graphical user interfaces (GUIs) as virtual controls including but not limited to windows, scroll bars, icons, and clipboards. The display 155 may comprise a single display or a plurality of displays in different sizes.

The I/O units 160 comprise a touch sensor 167 operable to detect touch operations on the display 155. The touch sensor 167 may comprise a transparent touch pad overlaid on the display 155 or arrays of optical touch transmitters and receivers located on the boarder of the display 155, such as those disclosed in US patent publication No. 20090189878.

1.2 Exemplary Embodiments of Main Memory

Nonvolatile memory 153 stores an operating system (OS) and application programs executable by the processor 151. The processor 151 may load runtime processes and data from the nonvolatile memory 153 to the main memory 152 and store digital content in a mass storage device 154. The media data playback device 100 may obtain digital content such as multimedia data through the communication unit 156. The main memory 152 may comprise a nonvolatile random access memory (NVRAM), such as phase-change random access memory (PRAM), magnetoresistive random access memory (MRAM), or other NVRAM comprising organic bistable memory material, such as those disclosed in U.S. Pat. No. 7,405,167, US patent publication No. 20090146140, or 20090221113. The nonvolatile memory 153 may comprise an electrically erasable programmable read-only memory (EE-PROM) or a flash memory, such as a NOR flash or a NAND flash. In the following, a PRAM is described as an example of the main memory 152, and a flash memory is described as an example of the nonvolatile memory 153.

A PRAM is a non-volatile memory storing data using chalcogenide materials, such as Germanium-Antimony-Tellurium alloy (Ge—Sb—Te or GST). The crystalline and amorphous states of the phase-change material GST have different electrical resistivity. Phase change between the crystalline and amorphous states may be obtained by temperature control. Under 150° C., both phases are stable. Over 200° C., nucleation of crystallites is fast and if the material is kept to the crystallization temperature for a sufficient time, it changes phase and becomes crystalline. In order to change the phase back to the amorphous state, the chalcogenide temperature is brought over the melting point (about 600° C.) and rapidly reduced.

Figure 3:
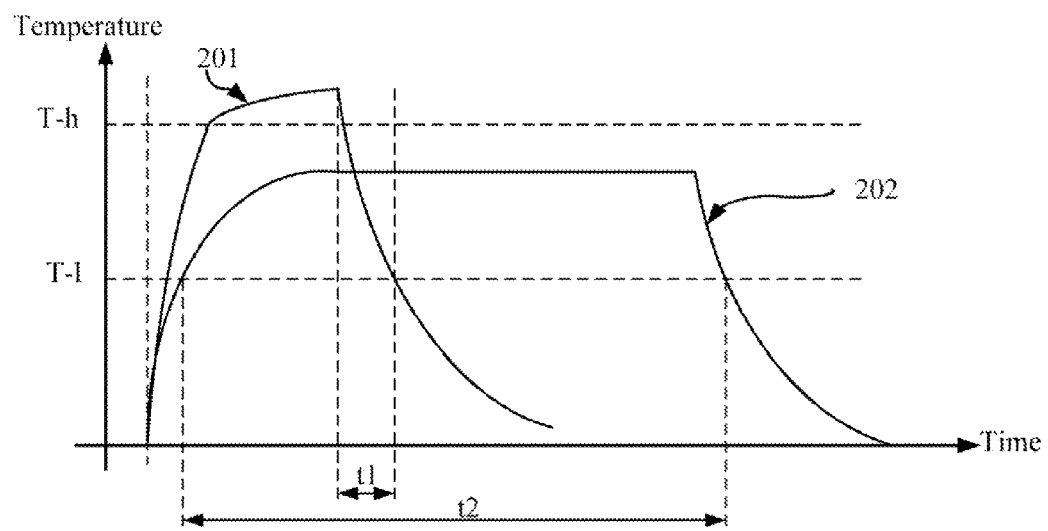
FIG. 3 is a schematic diagram showing an set and reset pulses of an exemplary embodiment of a phase change memory element.

FIG. 3 shows the plots of the required temperature versus time to activate phase changes of the phase-change material GST. T-h indicates the melting temperature of the phase-change material GST, and T-l indicates the temperature at which crystallization of the phase-change material GST begins. A curve 201 referred to as a reset pulse shows temperature control for a phase change from the crystalline to the amorphous state, and curve 202 referred to as a set pulse shows temperature control for a phase change from the amorphous to the crystalline state. As shown, amorphization requires a short time but a high temperature heating followed by cooling in a very short time t1. Crystallization requires a long time heating (denoted by duration t2) to allow nucleation and crystal growing.

Figure 4:
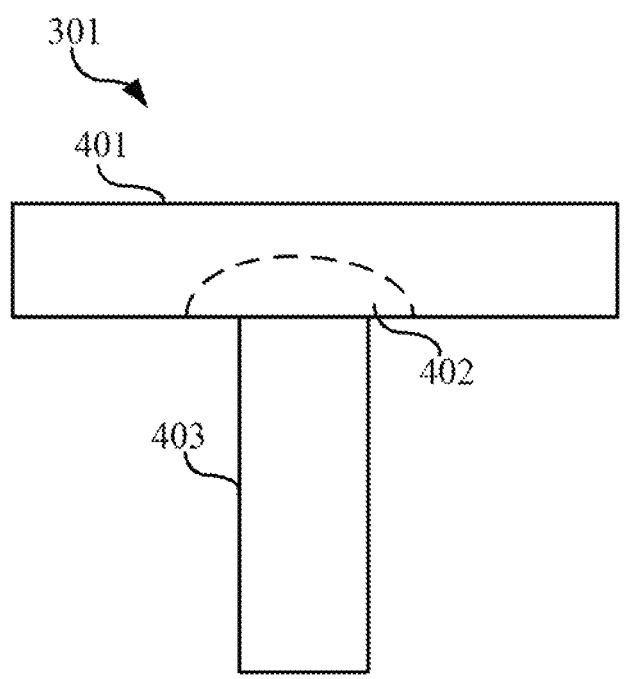
FIG. 4 is a schematic diagram of an exemplary embodiment of a cell of a phase change random access memory (PRAM).

FIG. 4 shows a memory device 301 made from the chalcogenide material. A heater 403 comprising a resistive electrode 403 in contact with or close to the chalcogenide material 401 may conduct current and be heated according to Joule effect to carry out the temperature control of set and reset pulses. The chalcogenide material 401 is generally in the crystalline state to allow good current flow. A portion 402 of the chalcogenide material 401 is in direct contact with the heater 403 and forms a phase change portion 402.

The state of the chalcogenide region 402 may be read by applying a sufficiently small voltage so as not to cause a sensible heating and measuring the current passing through it. Since the current is proportional to the conductance of the chalcogenide material, it is possible to discriminate between the two states.

Figure 5:
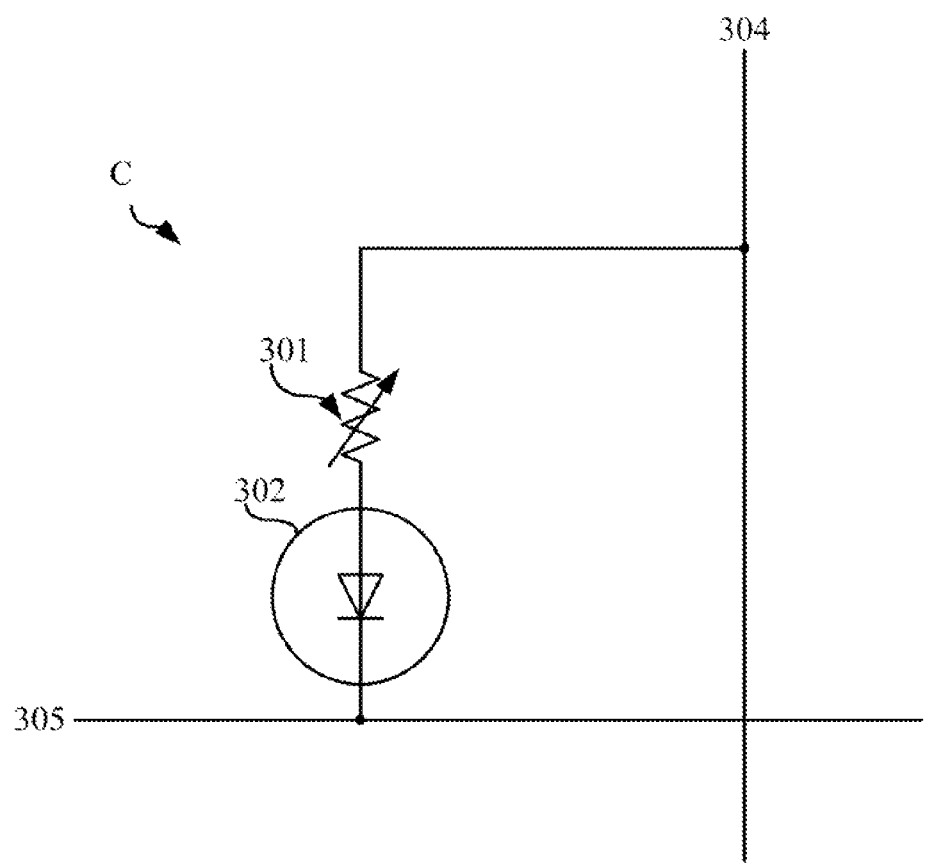
FIG. 5 is a cross section of an exemplary embodiment of a memory a cell of a PRAM.

FIG. 5 is an equivalent circuit diagram showing a unit cell C of a PRAM. The unit cell C of the PRAM includes the memory device 301 and a diode 302. The diode 302 is a selection element and may be replaced by a transistor. The memory device 301 comprises phase-change material and is connected to a bit line 304 and a P-junction of the diode 302. A word line 305 is connected to an N-junction of the diode 302.

The memory device 301 can be considered as a resistor, which conducts a different current according to its phase. When appropriately biased, the memory device 301 is defined as "set" or "logic 1" in condition of conducting a detectable current, and as "reset", or "logic 0" in condition of not conducting current or conducting a much lower current than a cell that is set.

The main memory 152 comprising an array of PRAM cells to provide random access to data stored in the main memory 152.

2. Exemplary Operations of the Media Data Playback Device

Figure 2:
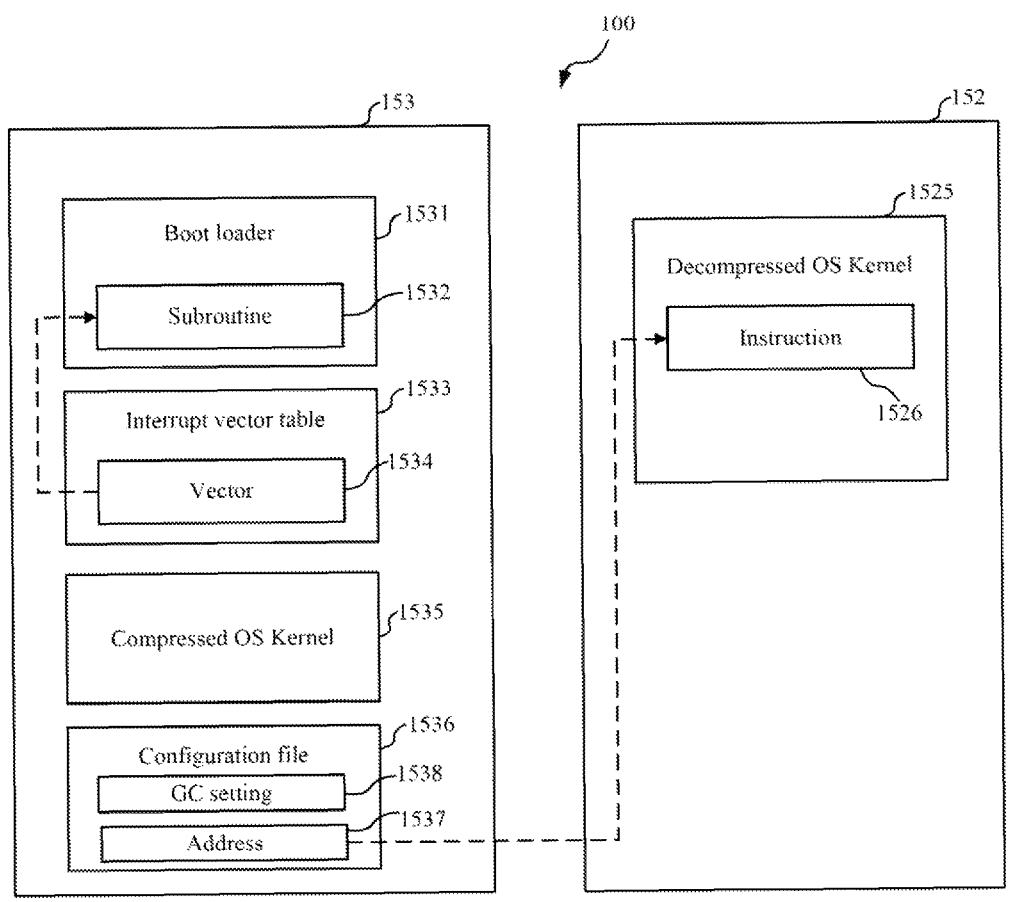
FIG. 2 is a block diagram of an exemplary embodiment of memory modules of the media data playback device.

With reference to FIG. 2, the nonvolatile memory 153 stores a boot loader 1531, a configuration file 1536 thereof, an operating system kernel 1535 in a compressed format, and an interrupt vector table 1533. A subroutine 1532 in the boot loader 1531 is registered as an interrupt service routine for an interrupt representative of a shutdown or power-off command and is targeted by a vector 1534 in the interrupt vector table 1533. The configuration file 1536 further comprises a garbage collection (GC) setting 1538 specifying options of garbage collection processes. The GC setting 1538 may be user adjustable or automatically configured by the processor 151 according to system usage, such as use time from last bootstrapping of the device 100.

When the I/O units 160 receives a depression of a power key of the media data playback device 100 a representative of a boot or power-on command, the processor 151 executes the boot loader 1531 to perform bootstrapping, initialization and to trigger migration of the kernel 1535 in response to the boot command. Wherein, the migration of the kernel 1535 comprises loading and decompressing thereof from the nonvolatile memory 153 to the main memory 152, to generate kernel 1525 in the main memory 152. The processor 151 executes operations of the OS. The migration of the kernel 1535 in response to the boot command is referred to as a first migration of the kernel 1535. The bootstrapping comprises clearing of the main memory 152.

2.1 Operations Before Device Shutdown

Figure 6:
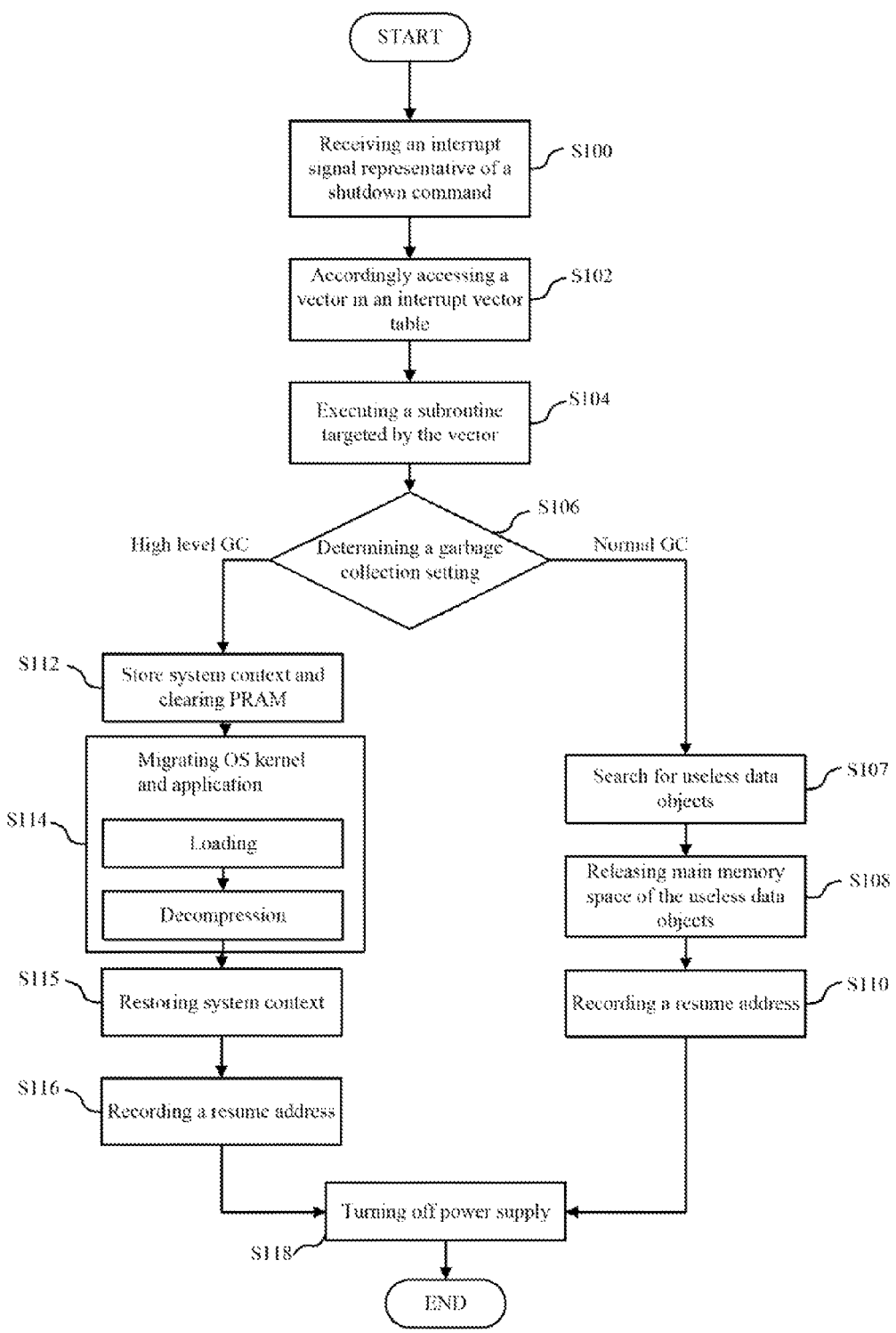
FIG. 6 is a flowchart showing exemplary operations of the media data playback device in response to a shutdown command.

With reference to FIG. 6, during operation of the media data playback device 100, the I/O units 160 receives depression of a power key of the media data playback device 100, and issues an interrupt signal representative of a shutdown command to the processor 151 (step S100). The processor 151 performs the following operations in response to the shutdown command. The processor 151 accesses a vector 1534 in the interrupt vector table 1533 corresponding to the interrupt signal (step S102), retrieves and executes a subroutine 1532 targeted by the vector 1534 (step S104). Under direction of the subroutine 1532, the processor 151 may display a shutdown message or disable video signal output, and performs one of a plurality of levels of garbage collection (GC) detailed in the following according to a GC setting.

The processor 151 determines a GC setting 1538 in a configuration file 1536 (step S106). In response to a GC setting indicative of normal garbage collection, the processor 151 searches the main memory 152 for data objects that cannot be accessed by other programs in the device 100 (step S107) and releases space of the main memory 152 occupied by these objects (step S108). The processor 151 records an address 1537 of the main memory 152 from which execution of the kernel 1535 is designated to resume (step S110) and triggers the device 100 to power off (step S118).

In response to a GC setting indicative of high level garbage collection, the processor 151 stores system context to the nonvolatile memory 153, clears the main memory 152 (step S112), triggers a further migration of the kernel 1535 and application programs from the nonvolatile memory 153 to the main memory 152 according to the stored system context (step S114), and restores system context (step S115). The clearing of the main memory 152 comprises deleting all data in the main memory 152. The migration of the kernel 1535 in response to the shutdown command is referred to as a second migration and comprises loading and decompressing of the compressed kernel 1535 from the nonvolatile memory 153 to the main memory 152. Similarly, the migration of the application programs comprises loading and decompressing thereof from the nonvolatile memory 153 to the main memory 152. The system context comprises hardware component configurations, page tables, process management data, process data structure of the application programs, and other system settings. In step S115, the processor 151 may restore a portion of the system context, for example, a portion thereof to the main memory 152. The remaining portions of the system context may be restored during subsequent bootstrapping of the device 100. Data and program distribution in the main memory 152 is rearranged through the step S114. The processor 151 records an address 1537 of the main memory 152 from which execution of the kernel 1535 is designated to resume in response to reboot of the media data playback device 100 (step S116) and triggers the device 100 to power off (step S118). For example, the processor 151 turns off the power supply 158.

The clearing of the main memory 152 and the migration of the kernel 1535 is a portion of normal bootstrapping of the device 100. Through the execution of steps S112 and S114, the processor 151 performs a portion of the bootstrapping of the device 100 in response to the shutdown command before actually shutting down the device 100. The processor 151 may rearrange utilization of the main memory 152 after the migration of the kernel 1535 and other application programs before actually shutting down the device 100. Alternatively, in step S114, the processor 151 may only trigger migration of the kernel 1535. The processor 151 may disable other interrupt handling for any subsequent interrupt during execution of the steps S107, S108, S110, S112, S114, S115, and S116 and render these steps non-interruptible.

2.2 Operations During Device Bootstrapping

Figure 7:
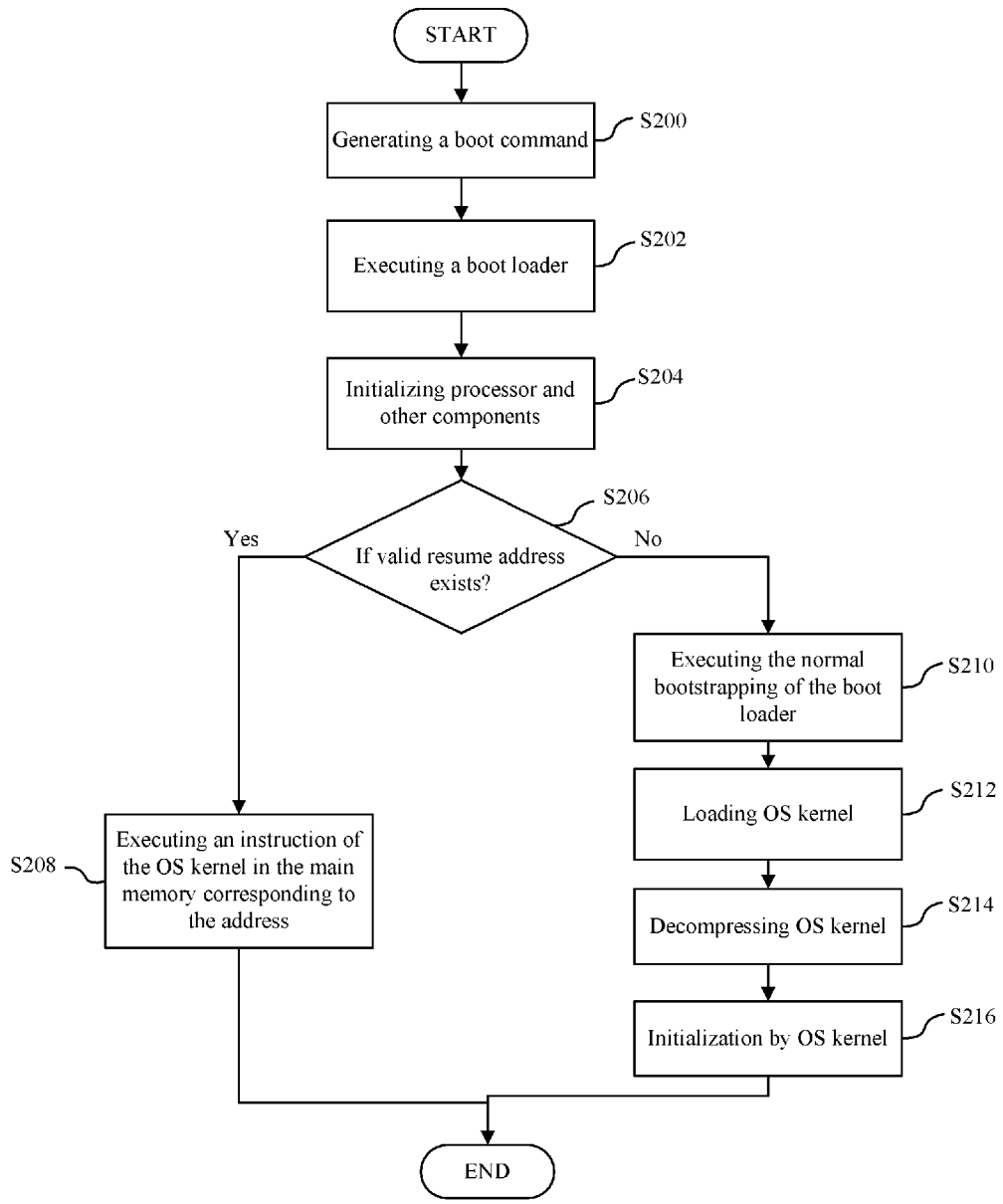
FIG. 7 is a flowchart showing exemplary operations of the media data playback device in response to a boot command.

With reference to FIG. 7, during power off state of the media data playback device 100, depression of the power key of the media data playback device 100 triggers a boot command to the processor 151 (step S200). The processor 151 performs the following operations in response to the boot command.

When receiving the boot command from the input unit, the processor 151 executes the boot loader 1531 (step S202). The boot loader 1531 directs initialization of the processor 151 and other components of the device 100 (step S204), and directs the processor 151 to determine if a valid resume address exists (step S206). When determining that the valid resume address 1537 exists, the processor 151 retrieves the stored resume address 1537 and executes an instruction 1526 of the kernel 1525 in the main memory 152 corresponding to the address 1537 (step S208). A dotted arrow in FIG. 2 shows relationship between the address 1537 and the instruction 1526. Thus, the processor 151 switches execution to the address 1537 of the main memory 152. Clearing of the main memory 152 and the migration of the kernel 1535 and application programs after the boot command is not performed, thus reducing time required for rebooting the device 100.

When determining that the valid resume address 1537 does not exist, the processor 151 executes the normal bootstrapping of the boot loader 1531 (step S210), loads and decompresses the OS kernel 1535 to generate the OS kernel 1525 (steps S212 and S214), and performs other system initialization under direction of the OS kernel 1525 (step S216). The bootstrapping in step S201 comprises clearing of the main memory 152.

3. Conclusion

In conclusion, one of different levels of garbage collection is performed between reception of a shutdown command and actual power-off of the device 100. Thus, memory utilization may be well managed to endure long-term usage. Procedures in normal bootstrapping, such as clearing of the main memory 152, and migration of OS kernel, are partially performed prior to actual booting of the device 100 to reduce boot time.

It is to be understood, however, that even though numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A reboot method executable by an electronic computing device comprising a first nonvolatile memory storing a kernel of an operating system, wherein a main memory of a processor of the electronic computing device comprises a second nonvolatile memory of the electronic computing device, and an instance of a migration of the kernel comprises loading of the kernel from the first nonvolatile memory to the second nonvolatile memory, the reboot method comprising:
    triggering a first instance of the migration of the kernel in response to a first boot command of the electronic computing device;
    receiving a shutdown command of the electronic computing device;
    responding to the shutdown command by determining whether to further trigger a second instance of the migration of the kernel before a shutdown process of the electronic computing device;
    triggering the second instance of the migration of the kernel before the shutdown process of the electronic computing device and an instance of the shutdown process of the electronic computing device according to a first consequence of the determining in response to the shutdown command; and
    triggering an instance of the shutdown process of the electronic computing device bypassing the second instance of the migration of the kernel according to a second consequence of the determining in response to the shutdown command.

2. The reboot method as claimed in claim 1, wherein the first nonvolatile memory stores the kernel in a compressed format, and the migration of the kernel comprises loading and decompressing of the compressed kernel from the first nonvolatile memory to the second nonvolatile memory.

3. The reboot method as claimed in claim 1, wherein the electronic computing device stores a memory releasing setting indicative of one of a plurality of memory releasing levels, and the reboot method further comprises:
    triggering the second instance of the migration of the kernel in response to the shutdown command upon a condition that the memory releasing setting is indicative of a high level memory releasing.

4. The reboot method as claimed in claim 1, further comprising:
    recording in the first nonvolatile memory a resume address of the second nonvolatile memory from which execution of the kernel is designated to resume in response to reboot of the electronic computing device, and
    shutting down the electronic computing device in response to the shutdown command.

5. The reboot method as claimed in claim 4, further comprising:
    receiving a second boot command; and
    executing a boot loader which switches execution by the processor to an instruction targeted by the resume address in the second nonvolatile memory in response to the second boot command.

6. The reboot method as claimed in claim 1, wherein the processor clears the entirety of the second nonvolatile memory before the second instance of the migration of the kernel.

7. The reboot method as claimed in claim 1, wherein the processor disables interrupt handling for any subsequent interrupt during the second instance of the migration of the kernel.

8. The reboot method as claimed in claim 1, wherein the second nonvolatile memory comprises phase change random access memory.

9. The reboot method as claimed in claim 1, wherein a subroutine in a boot loader directing the second instance of the migration of the kernel is registered as an interrupt service routine for an interrupt indicative of the shutdown command.

10. A reboot method executable by an electronic computing device comprising a first nonvolatile memory storing a kernel of an operating system, wherein a main memory of a processor of the electronic computing device comprises a second nonvolatile memory of the electronic computing device, and an instance of a migration of the kernel comprises loading of the kernel from the first nonvolatile memory to the second nonvolatile memory, the reboot method comprising:
    triggering a first instance of the migration of the kernel in response to a first boot command; and
    performing a shutdown command responsive process in response to a shutdown command, wherein the electronic computing device stores a memory releasing setting indicative of one of a plurality of memory releasing options, and the shutdown command responsive process comprises:
        searching for at least one computer readable data object in the second nonvolatile memory and releasing memory area in the second nonvolatile memory occupied by the at least one computer readable data object in response to the shutdown command before a shutdown process of the electronic computing device in response to the shutdown command upon a condition that the memory releasing setting is indicative of a first memory releasing option;
        triggering a second instance of the migration of the kernel in response to the shutdown command upon a condition that the memory releasing setting is indicative of a second memory releasing option; and
        performing an instance of the shutdown process of the electronic computing device in response to the shutdown command;
    wherein the released memory area in the second nonvolatile memory is prevented from data occupation during the shutdown command responsive process.

11. The reboot method as claimed in claim 10, wherein the first nonvolatile memory stores the kernel in a compressed format, and the migration of the kernel comprises loading and decompressing of the compressed kernel from the first nonvolatile memory to the second nonvolatile memory.

12. The reboot method as claimed in claim 10, further comprising:
    recording in the first nonvolatile memory a resume address of the second nonvolatile memory from which execution of the kernel is designated to resume in response to reboot of the electronic computing device, and
    shutting down the electronic computing device in response to the shutdown command.

13. The reboot method as claimed in claim 12, further comprising:
    receiving a second boot command; and
    executing a boot loader which switches execution to an instruction targeted by the resume address in the second nonvolatile memory in response to the second boot command.

14. An electronic computing device, comprising:
    a set of nonvolatile memory units comprising a first nonvolatile memory operable to store a kernel of an operating system;

a main memory comprising a second nonvolatile memory of the set of nonvolatile memory units, wherein an instance of a migration of the kernel comprises loading of the kernel from the first nonvolatile memory to the second nonvolatile memory;

an input unit operable to receive boot commands; and a processor operable to execute a reboot method comprising:

receiving a first boot command of the electronic computing device, wherein the first boot command is operable to trigger a bootstrapping process of the electronic computing device which at least comprises a manipulation process of clearing a memory area of the main memory;

executing a boot loader to trigger a first instance of the migration of the kernel in response to the first boot command in the bootstrapping process, wherein the bootstrapping process further comprises a manipulation process of the main memory associated with the first instance of the migration of the kernel, and the kernel is loaded to a portion of the memory area via the first instance of the migration;

receiving a shutdown command of the electronic computing device; and performing a portion of the bootstrapping process of the electronic computing device before a shutdown process of the electronic computing device in response to the shutdown command, wherein the portion of the bootstrapping process comprises clearing the memory area of the main memory under a first shutdown condition of the electronic computing device;

wherein the electronic computing device stores a memory releasing setting indicative of one of a plurality of memory releasing levels, and the reboot method further comprises:

triggering a second instance of the migration of the kernel in response to the shutdown command upon a condition that the memory releasing setting is indicative of a high level memory releasing.

15. The electronic computing device as claimed in claim 14, wherein the first nonvolatile memory stores the kernel in a compressed format, and the migration of the kernel comprises loading and decompressing of the compressed kernel from the first nonvolatile memory to the second nonvolatile memory.

16. The electronic computing device as claimed in claim 14, wherein the reboot method further comprises:

recording in the first nonvolatile memory a resume address of the second nonvolatile memory from which execution of the kernel is designated to resume in response to reboot of the electronic computing device, and shutting down the electronic computing device in response to the shutdown command.

17. The electronic computing device as claimed in claim 16, wherein the reboot method further comprises:

receiving a second boot command; and executing a boot loader which switches execution by the processor to an instruction targeted by the resume address in the second nonvolatile memory in response to the second boot command.

18. The electronic computing device as claimed in claim 14, wherein the portion of the bootstrapping process comprises:

clearing data in the second nonvolatile memory before a second instance of the migration of the kernel in response to the shutdown command.

19. The electronic computing device as claimed in claim 14, wherein the reboot method further comprises:

performing the shutdown process and bypassing clearing the memory area in the main memory in response to the shutdown command under a second shutdown condition of the electronic computing device.

20. The electronic computing device as claimed in claim 14, wherein the memory area of the main memory comprises the entire area of the main memory.

21. A reboot method executable by an electronic computing device comprising a main memory of a processor of the electronic computing device, the main memory comprising a nonvolatile memory and retaining data and programs stored in the main memory even if the electronic computing device is shut down, wherein a setting parameter d reflects a user operation to indicate one of a plurality of memory releasing levels, and the reboot method comprising:

performing a memory releasing process for the main memory in response to a shutdown command during a first optional shutdown process if the setting parameter is indicative of a low level memory releasing, wherein the memory releasing process comprises clearing one or more memory areas of the main memory to make more available memory space in the main memory through the shutdown command;

clearing the entirety of the main memory in response to the shutdown command during a second optional shutdown process if the setting parameter is indicative of a high level memory releasing, wherein at least one of the clearing of the one or more memory areas and the entirety of the main memory make more memory space for a next bootstrapping of the electronic computing device;

shutting down the electronic computing device in response to the shutdown command;

clearing the entirety of the main memory according to a configurable bootstrap-related field of the electronic computing device during a bootstrapping process of the electronic computing device in response to a first instance of a boot command of the electronic computing device upon a condition that the bootstrap-related field comprises a first value, wherein the bootstrap-related field reflects a bootstrapping sequence among a plurality of bootstrapping sequences of the electronic computing device associated with the bootstrapping process, and reflects a decision of whether to resume executable programming codes retained in the main memory during the bootstrapping process, wherein the executable programming codes is retained in the main memory over one of the first optional shutdown process and the second optional shutdown process; and bypassing the clearing of the entirety of the main memory during the bootstrapping process of the electronic computing device in response to the first instance of the boot command according to the bootstrap-related field upon a condition that the bootstrap-related field comprises a second value.

22. The reboot method as claimed in claim 21, wherein the bootstrap-related field is affected by a setting parameter which is indicative of one of a plurality of memory related values, and the reboot method further comprises:

clearing a located memory area of the main memory during the first optional shutdown process of the electronic computing device in response to the shutdown command if the setting parameter is indicative of a first setting parameter value; and bypassing the clearing of the located memory area of the main memory during the bootstrapping process of the electronic computing device in response to the first instance of the boot command upon a condition that the setting parameter is indicative of a second setting parameter value.

23. The reboot method as claimed in claim 21, wherein the setting parameter is indicative of one of a plurality of memory releasing levels, and the reboot method further comprises:
   performing a portion of the bootstrapping process of the electronic computing device before shutdown of the electronic computing device in response to the shutdown command, wherein the portion of the bootstrapping process comprises:
      triggering an instance of a migration of a kernel of an operating system upon a condition that the setting parameter is indicative of a high level memory releasing;
      recording in the bootstrap-related field a resume address of the second nonvolatile memory from which execution of the kernel is designated to resume in response to reboot of the electronic computing device; and
      shutting down the electronic computing device in response to the shutdown command.

24. The reboot method as claimed in claim 23, further comprising:
   disabling interrupt handling during the instance of the migration of the kernel.

25. The reboot method as claimed in claim 21, further comprising:
   retaining a kernel of an operating system in the main memory through one of the first optional shutdown process and the second optional shutdown process in response to the shutdown command of the electronic computing device;
   recording in the bootstrap-related field a resume address of the second nonvolatile memory from which execution of the kernel is designated to resume in response to a reboot of the electronic computing device; and
   shutting down the electronic computing device in response to the shutdown command.

26. The reboot method as claimed in claim 21, further comprising:
   retaining an executable instance of a kernel and at least one application program in the main memory through the first optional shutdown process upon a condition that the setting parameter is indicative of the low level memory releasing.

27. The reboot method as claimed in claim 21, further comprising:
   establishing a wireless cellular communication channel;
   establishing a wireless local area network communication channel; and
   providing a service of wide area network access by providing a wireless access point function offering the service based on the wireless cellular communication channel and the wireless local area network communication channel.

28. A reboot method executable by an electronic computing device comprising a main memory of a processor of the electronic computing device, the main memory comprising a nonvolatile memory and retaining data and programs stored in the main memory even if the electronic computing device is shut down, the reboot method comprising:
   utilizing a setting parameter to indicate one of a plurality of memory related values, the setting parameter comprises a memory releasing setting indicative of one of a plurality of memory releasing levels;
   performing a memory releasing process for the main memory in response to a shutdown command during a shutdown process if the memory releasing setting is indicative of a low level memory releasing, wherein the memory releasing process clears one or more memory areas of the main memory to make more available memory space in the main memory through the shutdown command; and
   clearing the entirety of the main memory in response to the shutdown command during a shutdown process if the memory releasing setting is indicative of a high level memory releasing;
   clearing the entirety of the main memory according to a configurable bootstrap-related field of the electronic computing device during a bootstrapping process of the electronic computing device in response to a first instance of a boot command of the electronic computing device upon a condition that the bootstrap-related field comprises a first value, wherein the bootstrap-related field reflects a bootstrapping sequence among a plurality of bootstrapping sequences of the electronic computing device associated with the bootstrapping process; and
   bypassing the clearing of the entirety of the main memory during the bootstrapping process of the electronic computing device in response to the first instance of the boot command according to the bootstrap-related field upon a condition that the bootstrap-related field comprises a second value;
   configuring the setting parameter in response to statistics of system usage of the electronic computing device.

29. An electronic computing device, comprising:
   a first nonvolatile memory operable to store a kernel of an operating system of the electronic computing device;
   a main memory comprising a second nonvolatile memory of the electronic computing device;
   an input unit operable to receive an input operation and to issue at least one command of boot commands and shutdown commands; and
   a processor connected to the first nonvolatile memory, the second nonvolatile memory, and the input unit, and operable to utilize the second nonvolatile operable as the main memory of the electronic computing device such that the processor loads programs and data to the main memory, wherein the main memory receives and stores the loaded programs and data, a setting parameter of the electronic computing device is indicative of one of a plurality of memory related values, wherein the setting parameter reflects a user operation and is associated with a decision of whether the main memory retains executable programming codes over shutdown of the electronic computing device for resumable execution during a next bootstrapping process of the electronic computing device after the shutdown, and the processor executes a reboot method comprising:
   clearing a portion of the main memory during a state transition process of the electronic computing device in response to an interrupt representing a shutdown command if the setting parameter of the electronic computing device is indicative of a first parameter value; and
   clearing the entirety of the main memory according to the setting parameter of the electronic computing device indicative of second parameter value during the state transition process of the electronic computing device in response to the interrupt, wherein the interrupt is issued to change an operating state of the electronic computing device in response to an operation of the input unit;

wherein at least one of the clearing of at least one of the portion of the main memory and the clearing of the entirety of the main memory make more memory space for a next bootstrapping of the electronic computing device.

30. The electronic computing device as claimed in claim 29, wherein the interrupt is issued by the input unit in response to a depression operation on a power key of the input unit, and the power key is operable to trigger one of the boot commands and the shutdown commands.

31. The electronic computing device as claimed in claim 29, wherein the reboot method further comprises:
    shutting down the electronic computing device in response to the shutdown command;
    clearing the entirety of the main memory according to a configurable bootstrap-related field of the electronic computing device during a bootstrapping process of the electronic computing device in response to a first instance of a boot command of the electronic computing device upon a condition that the bootstrap-related field comprises a first value, wherein the bootstrap-related field reflects a bootstrapping sequence among a plurality of bootstrapping sequences of the electronic computing device associated with the bootstrapping process, and reflects a decision of whether to resume executable programming codes retained in the main memory during the bootstrapping process, wherein the executable programming codes is retained in the main memory over shutdown of the electronic computing device; and
    bypassing the clearing of the entirety of the main memory during the bootstrapping process of the electronic computing device in response to the first instance of the boot command according to the bootstrap-related field upon a condition that the bootstrap-related field comprises a second value.

32. The electronic computing device as claimed in claim 29, wherein the setting parameter is indicative of one of a plurality of memory releasing levels, and the reboot method further comprises:
    performing a portion of a bootstrapping process of the electronic computing device before shutdown of the electronic computing device in response to a first instance of the shutdown command, wherein the portion of the bootstrapping process comprises:
        triggering an instance of a migration of the kernel to the main memory upon a condition that the setting parameter is indicative of a high level memory releasing;
    recording in a configurable memory-related field a resume address of the second nonvolatile memory from which execution of the kernel is designated to resume in response to reboot of the electronic computing device;
    shutting down the electronic computing device in response to the shutdown command; and
    bypassing clearing of the main memory and bypassing the instance of the migration of the kernel during an instance of the bootstrapping process of the electronic computing device according to the configurable memory-related field.

33. The electronic computing device as claimed in claim 32, wherein the reboot method further comprises:
    disabling interrupt handling during the instance of the migration of the kernel.

34. The electronic computing device as claimed in claim 29, further comprising:
    retaining an executable instance of the kernel in the main memory through a shutdown process associated with the shutdown command, wherein the setting parameter reflects whether the executable instance of the kernel is formed from a old version of the kernel lasting in the main memory or a new version of the kernel reloaded to the main memory.

35. An electronic computing device, comprising:
    a first nonvolatile memory operable to store a kernel of an operating system of the electronic computing device;
    a main memory comprising a second nonvolatile memory of the electronic computing device;
    an input unit operable to receive an input operation and to issue at least one command of boot commands and shutdown commands; and
    a processor connected to the first nonvolatile memory, the second nonvolatile memory, and the input unit, and operable to utilize the second nonvolatile operable as the main memory of the electronic computing device such that the processor loads programs and data to the main memory, wherein the main memory receives and stores the loaded programs and data, a setting parameter of the electronic computing device is indicative of one of a plurality of memory related values, and the processor executes a reboot method comprising:
    clearing a portion of the main memory during a state transition process of the electronic computing device in response to an interrupt representing a shutdown command if the setting parameter of the electronic computing device is indicative of a first parameter value; and
    clearing the entirety of the main memory according to the setting parameter of the electronic computing device indicative of a second parameter value during the state transition process of the electronic computing device in response to the interrupt, wherein the interrupt is issued to change an operating state of the electronic computing device in response to an operation of the input unit, wherein the reboot method further comprises:
    retaining a kernel of an operating system in the main memory through a shutdown process of the electronic computing device in response to the shutdown command of the electronic computing device, wherein the kernel is retained through the shutdown process for an expected resumption after the shutdown process;
    recording in a configurable memory-related field a resume address of the second nonvolatile memory from which execution of the kernel is designated to resume in response to a reboot of the electronic computing device;
    shutting down the electronic computing device in response to the shutdown command; and
    bypassing clearing of the main memory and bypassing loading of the kernel to the main memory during a bootstrapping process of the electronic computing device according to the configurable memory-related field.

36. An electronic computing device, comprising:
    a first nonvolatile memory operable to store a kernel of an operating system of the electronic computing device;
    a main memory comprising a second nonvolatile memory of the electronic computing device;
    an input unit operable to receive an input operation and to issue at least one command of boot commands and shutdown commands; and
    a processor connected to the first nonvolatile memory, the second nonvolatile memory, and the input unit, and operable to utilize the second nonvolatile operable as the main memory of the electronic computing device such that the processor loads programs and data to the main memory, wherein the main memory receives and stores the loaded programs and data, a setting parameter of the electronic computing device is indicative of one of a plurality of memory related values, and the processor executes a reboot method comprising:

configuring the setting parameter in response to statistics of system usage of the electronic computing device;

clearing a portion of the main memory during a state transition process of the electronic computing device in response to an interrupt representing a shutdown command if the setting parameter of the electronic computing device is indicative of a first parameter value; and clearing the entirety of the main memory according to the setting parameter of the electronic computing device indicative of second parameter value during the state transition process of the electronic computing device in response to the interrupt, wherein the interrupt is issued to change an operating state of the electronic computing device in response to an operation of the input unit.

37. A reboot method executable by an electronic computing device of which a main memory of a processor of the electronic computing device comprises a nonvolatile memory and retains data and programs stored in the main memory even if the electronic computing device is shut down, the reboot method comprising:

receiving an shutdown command operable to trigger a transition of a power state of the electronic computing device; and clearing one or more memory areas in the main memory according to a setting parameter of the electronic computing device in response to the shutdown command;

wherein the setting parameter comprises a memory releasing setting indicative of one of a plurality of memory releasing levels, and the clearing further comprises:

performing a memory releasing process for the main memory in response to the shutdown command if the memory releasing setting is indicative of a low level memory releasing, wherein the memory releasing process clears one or more memory areas of the main memory to make more available memory space in the main memory through the shutdown command that triggers the transition of the power state of the electronic computing device; and clearing the entirety of the main memory including the nonvolatile memory in response to the shutdown command if the memory releasing setting is indicative of a high level memory releasing;

wherein the reboot method further comprises:

configuring the setting parameter in response to statistics of system usage of the electronic computing device.

38. A reboot method executable by an electronic computing device of which a main memory of a processor of the electronic computing device comprises a nonvolatile memory and retains data and programs stored in the main memory even if the electronic computing device is shut down, wherein the electronic computing device further comprises a storage device storing a kernel of an operating system of the electronic computing device, and the reboot method comprising:

in a shutdown process of the electronic computing device responding to a shutdown command the reboot method further comprises:

receiving an interrupt representing the shutdown command operable to trigger a transition of a power state of the electronic computing device; and clearing one or more memory areas in the main memory according to a setting parameter of the electronic computing device in response to the interrupt;

wherein the setting parameter comprises a memory releasing setting indicative of one of a plurality of memory releasing levels, and the clearing further comprises:

performing a memory releasing process for the main memory in response to the interrupt if the memory releasing setting is indicative of a low level memory releasing, wherein the memory releasing process clears one or more memory areas of the main memory to make more available memory space in the main memory through the interrupt that triggers the transition of the power state of the electronic computing device; and clearing the entirety of the main memory including the nonvolatile memory in response to the interrupt if the memory releasing setting is indicative of a high level memory releasing;

retaining the kernel in the main memory through the shutdown process upon a condition that the setting parameter is indicative of a low level memory releasing;

recording in a configurable memory-related field a resume address of the main memory from which execution of the kernel is designated to resume in response to a reboot of the electronic computing device; and shutting down the electronic computing device in response to the interrupt representing the shutdown command; and in a bootstrapping process of the electronic computing device responding to a bootstrapping command the reboot method further comprises:

bypassing clearing of the main memory and bypassing loading of the kernel to the main memory during the bootstrapping process of the electronic computing device according to the configurable memory-related field; and resuming execution of the kernel utilizing the configurable memory-related field.

39. The reboot method as claimed in claim 38, wherein the interrupt is issued by an input unit of the electronic computing device in response to a depression operation on a power key of the input unit, and the power key is operable to trigger one command among boot commands and shutdown commands.

40. The reboot method as claimed in claim 38, further comprising:

retaining application programs in the main memory through the shutdown process upon a condition that the setting parameter is indicative of the low level memory releasing.

41. The reboot method as claimed in claim 38, further comprising:

clearing the entirety of the main memory including the nonvolatile memory in response to the bootstrapping command according to the configurable memory-related field.

42. The reboot method as claimed in claim 38, wherein the setting parameter reflects a user operation.

43. The reboot method as claimed in claim 38, further comprising:

establishing a wireless cellular communication channel;

establishing a wireless local area network communication channel; and providing a service of wide area network access by providing a wireless access point function offering the service based on the wireless cellular communication channel and the wireless local area network communication channel.

44. The reboot method as claimed in claim 38, wherein the nonvolatile memory functions as the main memory of the processor of the electronic computing device according to hardware architecture of the electronic computing device.

45. A reboot method executable by an electronic computing device comprising a main memory of a processor of the electronic computing device, the main memory comprising a nonvolatile memory and retaining data and programs stored in the main memory even if the electronic computing device is shut down, the reboot method comprising:

clearing the entirety of the main memory according to a configurable bootstrap-related field of the electronic computing device during a bootstrapping process of the electronic computing device and loading an operating system kernel to the main memory in response to a first instance of a boot command of the electronic computing device upon a condition that the bootstrap-related field comprises a first value, wherein the bootstrap-related field reflects a bootstrapping sequence among a plurality of bootstrapping sequences of the electronic computing device associated with the bootstrapping process; and resuming execution of an existing instance of the operating system kernel retained in the main memory by bypassing the clearing of the entirety of the main memory during the bootstrapping process of the electronic computing device in response to the first instance of the boot command according to the bootstrap-related field upon a condition that the bootstrap-related field comprises a second value;

wherein the existing instance of the operating system kernel is retained in the main memory through a shutdown state of the electronic computing device before the bootstrapping process.

46. The reboot method as claimed in claim 45, wherein the execution of the existing instance of the operating system kernel is resumed according to a resume address during the bootstrapping process to bypass reloading of the operating system kernel, and the resume address indicates an instruction of the existing instance of the operating system kernel and is stored in a nonvolatile memory area before a shutdown process prior to bootstrapping process.

* * * * *